United States Patent [19]

Dinglinger

[11] 4,203,299

[45] May 20, 1980

[54] APPARATUS FOR METERING SMALL AMOUNTS OF A LOW BOILING LIQUEFIED GAS

[75] Inventor: Gunter Dinglinger, Kaarst, Fed. Rep. of Germany

[73] Assignee: Messer Griesheim GmbH, Frankfurt am Main, Fed. Rep. of Germany

[21] Appl. No.: 924,184

[22] Filed: Jul. 13, 1978

[30] Foreign Application Priority Data

Jul. 16, 1977 [DE] Fed. Rep. of Germany ....... 2732318

[51] Int. Cl.² .................................................. F17C 7/02
[52] U.S. Cl. ..................................... 62/49; 62/514 R
[58] Field of Search ............... 62/51, 45, 49, 55, 503, 62/509, 514 R

[56] References Cited

U.S. PATENT DOCUMENTS

| | | |
|---|---|---|
| 2,613,505 | 10/1952 | Nolcken .......................... 62/514 R |
| 2,988,898 | 6/1961 | Hesson et al. .................. 62/514 R |
| 3,025,680 | 3/1962 | DeBrosse et al. ............... 62/514 R |
| 3,092,978 | 6/1963 | Lorentzen ........................... 62/503 |
| 3,456,675 | 6/1969 | Ehrens et al. ........................ 62/51 |
| 3,469,597 | 9/1969 | Bugnulo .............................. 62/49 |
| 3,472,038 | 10/1969 | Staas ................................... 62/45 |
| 3,972,202 | 8/1976 | Stearns ........................... 62/514 R |
| 4,129,146 | 12/1978 | Schuler .............................. 62/45 |

*Primary Examiner*—Ronald C. Capossela
*Attorney, Agent, or Firm*—Connolly and Hutz

[57] ABSTRACT

Small amounts of low boiling liquefied gas are metered in an apparatus which has a pipeline exiting into a hollow sintered metal body mounted within an inner container with the container having a drain hole at its bottom for liquefied gas and at least one discharge opening at its upper portion for evaporated gas; the inner container is surrounded by an insulated outer container with a space therebetween and with a gas discharge opening in the outer container beneath the drain hole for liquefied gas.

6 Claims, 4 Drawing Figures

APPARATUS FOR METERING SMALL AMOUNTS OF A LOW BOILING LIQUEFIED GAS

BACKGROUND OF THE INVENTION

The invention relates to an apparatus for metering small amounts of a low boiling liquefied gas.

Very small amounts of low boiling liquefied gases are very difficult to meter, since the accumulated liquid gas is, in general, under pressure and has a temperature which corresponds to the boiling pressure or which lies above the boiling temperature at atmospheric pressure. The gas which is formed during pressure release in the supply line or at the discharge opening, therefore, again and again interrupts the continuously running liquid flow so that a uniform metering becomes impossible.

The problem of metering small amounts of low boiling liquefied gases occurs particularly in packaging various types of foods in which, for example, nitrogen is the inert gas or in which the liquefied gas has to profuse a certain internal pressure after closing the wrapping. A process for metering small amounts of low boiling liquefied gases is known from German Offenlegungschrift No. 25 48 745 according to which an absorbent body of a certain size is soaked with the low temperature liquefied gas. The absorbent body is then placed in the wrapping or the container which are subsequently closed. A very accurate metering of the liquid gas is indeed attained with this process, however, a foreign body is inevitably present in the package. This is not desirable in most cases.

SUMMARY OF THE INVENTION

The invention has, therefore, as its object providing an apparatus for metering small amounts of a low boiling liquefied gas, which permits a very accurate metering and prevents the presence of foreign bodies in packages because of metering.

An apparatus has now been found for metering small amounts of a low boiling liquefied gas which is supplied to the metering position by means of a pipeline whereby according to the invention, the pipeline exits in an internally hollow sintered metal body which is mounted inside an inner container which has a drain hole for liquefied gas in its bottom and at least one discharge opening for evaporated gas in its upper portion and which in turn is surrounded while forming an intermediate space by an outer container provided with an insulation, which has a gas discharge opening underneath the drain hole for the liquefied gas.

In an advantageous embodiment of the invention, a measuring probe is mounted inside the container which carries the liquefied gas, which controls the supply of liquefied gas through the pipeline as a function of the height of the liquid level.

In further embodiment of the invention, a closing device may be provided on the drain hole which makes an optional interruption of the draining liquid gas flow possible. This closing device consists preferably of a disc which can be rotated about a vertical shaft, which covers the drain hole for liquefied gas during a portion of a complete revolution. The drain hole is covered in this case, depending on the shape of the disc, over a shorter or longer period of time during one revolution.

THE DRAWINGS

DETAILED DESCRIPTION

Figure 1:
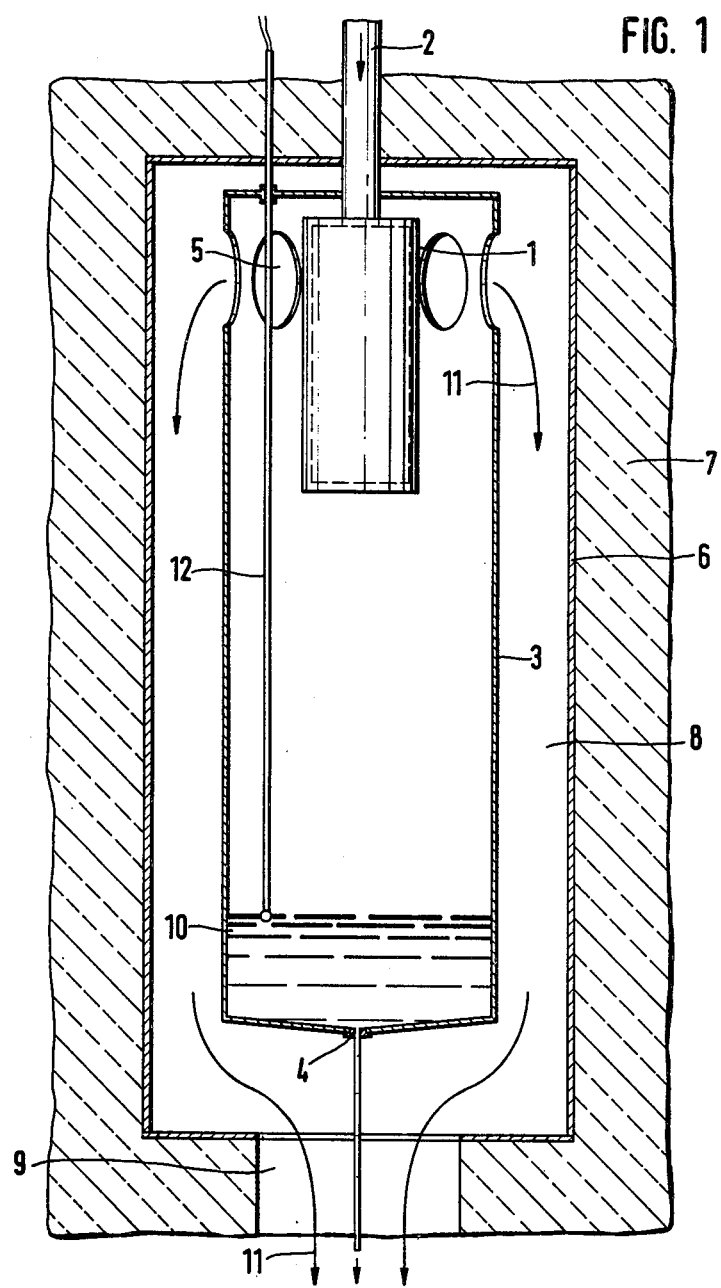
FIG. 1 is a vertical cross sectional view through an apparatus according to the invention.

The apparatus shown in FIG. 1 consists of a sintered metal body 1 which is located at the end of the pipeline 2 which serves to supply the liquefied gas. Sintered metal body 1 is mounted in an inner container 3 which has a drain hole 4 for the liquefied gas in its bottom and several discharge openings 5 for evaporated gas in its upper portion. The container 3 is in turn surrounded by an outer container 6 which is provided with an insulation 7. An intermediate space 8 is formed between container 3 and 6. Container 6 and insulation 7 have a gas discharge opening 9 which is located underneath the drain hole 4 for the liquefied gas in container 3.

Figure 2:
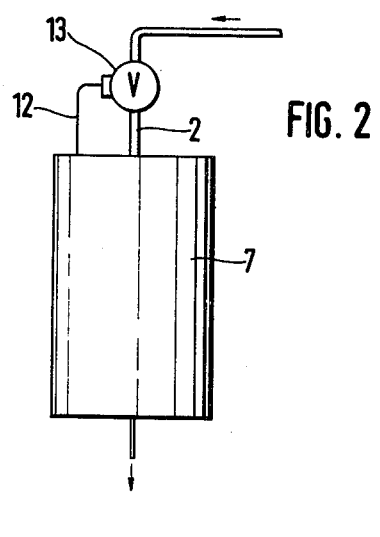
FIG. 2 is an elevational view of the apparatus according to the invention.

The operating method according to the invention is as follows: the liquefied gas, for example, nitrogen which is under pressure and mixed with gas arrives through pipeline 2 in the sintered metal body 1 the cross section of which is larger than the supply pipeline. The sintered metal body 1 is permeable to gaseous and liquefied gas. The liquid nitrogen which is pressure-released and now under atmospheric pressure and which boils at $-196°$ C. accumulates at the bottom of container 3. The cold gaseous nitrogen which is also $-196°$ C. enters space 8 between the containers 3 and 6 through the discharge openings 5. The gas flow is indicated by arrows 11. The cold gas now flows slowly to the large gas discharge opening 9 and at the same time cools the entire apparatus so much that the liquid nitrogen held in the container 3 receives as little heat as possible from the outside. Because of the low speed of the gaseous nitrogen 11, the stream of liquid nitrogen draining through drain hole 4 is not disturbed by the gas flow. It is useful that drain hole 4 consists of an interchangeable nozzle. The size of the draining liquid stream can then be changed depending on the requirement. The draining amount of liquid nitrogen is determined in addition to the cross section of drain hole 4 also by the height of the liquid level of the liquid nitrogen 10. The liquid level is, therefore, kept constant by means of a measuring probe 12 which is adjustable in height and which as is shown in FIG. 2, opens or closes the solenoid valve 13, mounted in pipeline 2, depending on the requirement. Since the fine liquid stream, draining through drain hole 4 is surrounded by gaseous nitrogen, the influx of air humidity is prevented so that drain hole 4 cannot ice up.

Figure 3:
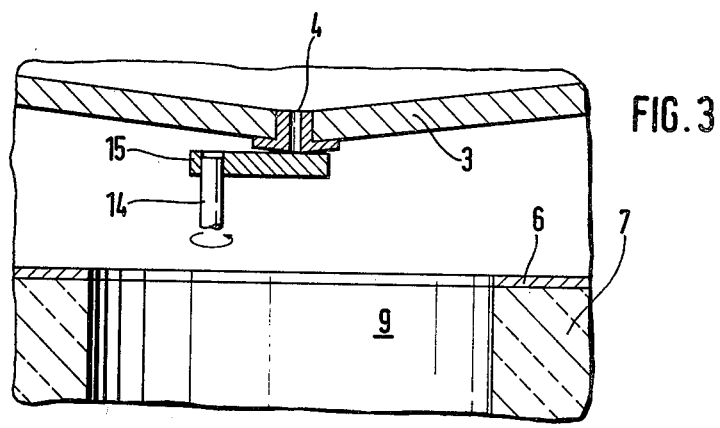
FIG. 3 illustrates a drain hole of the apparatus according to the invention provided with a closing device.

The drain hole 4 and the gas discharge opening 9 are shown in FIG. 3 on an enlarged scale. The drain hole 4 additionally contains a schematically shown closing device which consists of a disc 15 which can rotate around a vertical shaft 14. When the disc 15 moves under the drain hole 4 this is closed off. Depending on the shape of the disc 15, the drain hole 4 is closed for a shorter or longer period of time. As a result, it is possible to meter the liquid nitrogen intermittently which is necessary in most cases in mechanical packaging.

Figure 4:
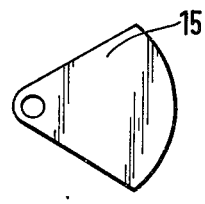
FIG. 4 is a plan view of the disc for the closing device of FIG. 3.

FIG. 4 shows a possible shape of the disc 15.

What is claimed is:

1. In an apparatus for metering from a metering position small amounts of a low boiling liquefied gas which are returned by means of a pipeline to the metering position, the improvement being said pipeline exiting in an internally hollow sintered metal body, said body being mounted inside an inner container, said inner container having a drain hole for liquefied gas at its bottom and at least one discharge opening for evaporated gas in its upper portion thereof, said inner container being surrounded by an outer container, said outer container being provided with an insulation, an intermdiate space being between said containers, and said space communicating with a gas discharge opening in said outer container underneath said drain hole for liquefied gas.

2. Apparatus according to claim 1, characterized by a measuring probe mounted inside said inner container to control the supply of liquefied gas through said pipeline as a function of the height of the liquid level in said inner container.

3. Apparatus according to claim 2, characterized by a closing device at said drain hole for liquefied gas.

4. Apparatus according to claim 3, characterized in that said closing device comprises a disc mounted for rotation about a vertical shaft, and said disc covering said drain hole for liquefied gas during a portion of a complete revolution.

5. Apparatus according to claim 1, characterized by a closing device at said drain hole for liquefied gas.

6. Apparatus according to claim 5, characterized in that said closing device comprises a disc mounted for rotation about a vertical shaft, and said disc covering said drain hole for liquefied gas during a portion of a complete revolution.

* * * * *